United States Patent
Vembu et al.

(10) Patent No.: US 9,589,159 B2
(45) Date of Patent: Mar. 7, 2017

(54) CREATING SECURE COMMUNICATION CHANNELS BETWEEN PROCESSING ELEMENTS

(75) Inventors: Balaji Vembu, Folsom, CA (US);
Aditya Navale, Folsom, CA (US);
Sathyamurthi Sadhasivan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 12/492,513

(22) Filed: Jun. 26, 2009

(65) Prior Publication Data

US 2010/0332852 A1  Dec. 30, 2010

(51) Int. Cl.
| | | |
|---|---|---|
| G06F 12/14 | (2006.01) | |
| G06F 21/84 | (2013.01) | |
| G06F 21/72 | (2013.01) | |
| H04L 9/08 | (2006.01) | |

(52) U.S. Cl.
CPC .............. G06F 21/84 (2013.01); G06F 21/72 (2013.01); H04L 9/0841 (2013.01); *H04L 2209/60* (2013.01)

(58) Field of Classification Search
CPC .......... G06F 21/72; G06F 21/84; G06F 21/00; G06F 21/70; G06F 21/71; G06F 21/82; G06F 21/53; G06F 21/57; G06F 21/62; G06F 21/6209; G06F 21/6218; H04L 2209/60; H04L 2209/00; H04L 9/0841; H04L 9/00; H04L 9/08; H04L 9/16; H04L 9/38

USPC ........................................................ 713/164
See application file for complete search history.

(56) References Cited

U.S. PATENT DOCUMENTS

| | | | | |
|---|---|---|---|---|
| 7,940,934 | B2 * | 5/2011 | Buer ................... | H04L 63/0428 380/277 |
| 2002/0163522 | A1 * | 11/2002 | Porter ................. | G06F 12/1441 345/533 |
| 2003/0135742 | A1 * | 7/2003 | Evans ..................... | G06F 21/84 713/189 |
| 2003/0235303 | A1 * | 12/2003 | Evans ..................... | G06F 21/84 380/216 |
| 2004/0071293 | A1 * | 4/2004 | Yamamichi ........... | H04L 9/3093 380/277 |

(Continued)

*Primary Examiner* — William Goodchild
(74) *Attorney, Agent, or Firm* — Trop Pruner & Hu, P.C.

(57) ABSTRACT

Two processing elements in a single platform may communicate securely to allow the platform to take advantage of the certain cryptographic functionality in one processing element. A first processing element, such as a bridge, may use its cryptographic functionality to request a key exchange with a second processing element, such as a graphics engine. Each processing element may include a global key which is common to the two processing elements and a unique key which is unique to each processing element. A key exchange may be established during the boot process the first time the system boots and, failing any hardware change, the same key may be used throughout the lifetime of the two processing elements. Once a secure channel is set up, any application wishing to authenticate a processing element without public-private cryptographic function may perform the authentication with the other processing element which shares a secure channel with the first processing element.

18 Claims, 4 Drawing Sheets

(56) References Cited

U.S. PATENT DOCUMENTS

| | | | |
|---|---|---|---|
| 2005/0074125 A1* | 4/2005 | Chavanne | G06F 21/10 380/278 |
| 2007/0006169 A1* | 1/2007 | Iliev | G06F 21/57 717/131 |
| 2007/0088959 A1* | 4/2007 | Cox | G06F 21/72 713/189 |
| 2009/0172331 A1* | 7/2009 | Vembu | G06F 21/10 711/163 |

* cited by examiner

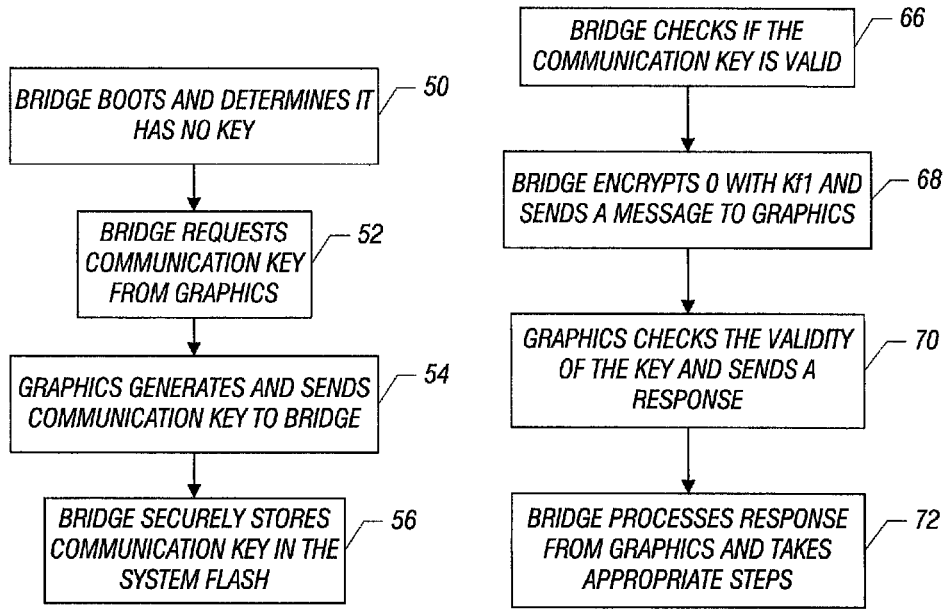
FIG. 2
FIG. 4
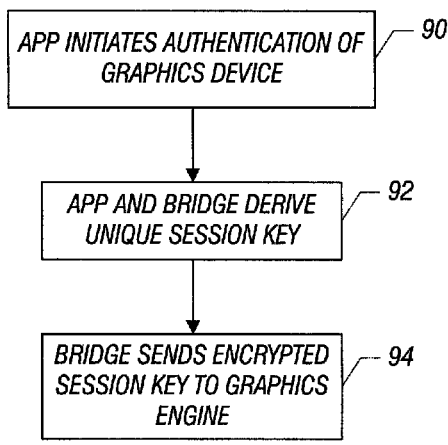
FIG. 6

CREATING SECURE COMMUNICATION CHANNELS BETWEEN PROCESSING ELEMENTS

BACKGROUND

This relates generally to communications between processing elements.

In a number of instances, one processing element in a platform may wish to communicate with another processing element in the same platform. Examples of such communications include communications between input/output (I/O) bridges and graphics chips or communications between a chipset and a graphics chip. Each of the chipset, the graphics chip, and the bridge may have an integrated internal controller or processor.

There are instances when two of these processor-based components wish to communicate in a secure fashion. Typically, such secure communications involve repeated establishment of secure communication channels between the two different devices.

Various types of secure content may be received to be played back on a computer. For example, pay per view video or proprietary content may be received on a computer system for playback. Digital versatile disk (DVD) content may also be played on computers. This content may arrive in an encrypted fashion and, therefore, cannot easily be intercepted in route to the receiving computer.

However, once the content arrives at the computer, it may be decrypted for playback. Once decrypted, it may be accessed by malevolent software in the computer system and stolen by unauthorized entities. Unauthorized copies of software, DVD disks, games, videos, and other content may be made in this way.

BRIEF DESCRIPTION OF THE DRAWINGS

FIG. 2 is a flow chart for the embodiment shown in FIG. 1 in accordance with one embodiment;

FIG. 4 is a flow chart for the embodiment shown in FIG. 3 in accordance with one embodiment;

FIG. 6 is a flow chart for the embodiment shown in FIG. 5 in accordance with one embodiment.

DETAILED DESCRIPTION

Figure 1:
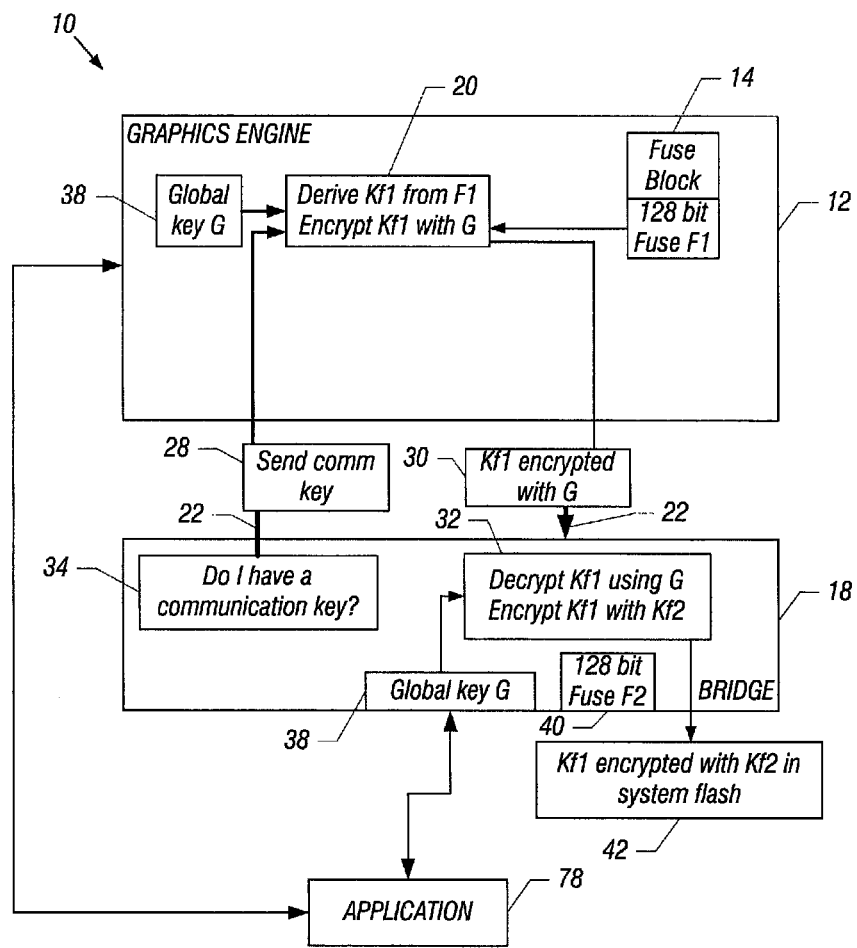
FIG. 1 is a depiction of a system in accordance with one embodiment of the present invention.

Referring to FIG. 1, a processor-based system 12, such as a graphics engine, includes a processor or controller. The system 12 may wish to communicate with another processor-based system 18, such as a bridge, in this example. However, the two processor-based systems 12 and 18 may be a variety of different devices, including a central processing unit, a south bridge, a north bridge, a peripheral component hub, or a graphics engine, to mention a few examples.

The systems 12 and 18 may be part of a larger processor-based system 10, such as a personal computer, have a central processing unit coupled to the processors 12 and 18. Other examples of such larger systems 10 include media players, set top boxes, and handheld or mobile devices.

In one scenario, one of the two processor-based systems 12 or 18 may have a cryptographic capability. It may be advantageous, in some embodiments, to enable communications between the two devices without providing the same graphics capability in both devices. In one embodiment, the system 18 may have such a cryptographic capability. For example, it may have a so-called manageability engine (ME) or controller which implements cryptographic functions. As one example, it may include a direct, anonymous, attestation (DAA), public-private key system that provides RSA like functionality with an entity. No such capability may be provided on the other device 12.

In order to play a secure DVD disk, as one example, it is necessary for system 18 to perform a cryptographic operation with a third party application 78, such as a software player, and then communicate the result to system 12 in a secure fashion. This may be possible in some embodiments even though both systems 12 and 18 do not have the full cryptographic functionality that one of the devices, in this case the system 18, may possess.

Thus, upon booting of both the systems 12 and 18, the system 18 may initially inquire as to whether or not it has a secure communication key. In some embodiments, this may be done during the boot sequence of the system 10, after booting of the systems 12 and 18, but before completing system 10 boot and before there is any handoff of control to the operating system.

Thus, the boot environment is generally a secure environment. However, communications between the components 12 and 18, in some embodiments, may be done using a secure message protocol, such as vendor defined messages available with the PCI Express standard. See PCI Express Base 2.0 Specification (2007), available from the PCI Special Interest Group, Beaverton, Oreg. 97006. Messages using the vendor defined message (VDM) protocol may be exchanged in a proprietary fashion.

Thus, the system 18 may initially ask whether it has a communication key 34. It then sends a request for a communication key, as indicated at 28, over a direct memory interface (DMI) interconnecting bus communication links 22, for example. The message may be received within the system 12 by a traffic control entity. The system 12 may have a global key 38 in one embodiment. The global key 38 may be provided to all devices that are meant to operate with one another. All of these devices may have the same global key G. Thus, in this embodiment, the system 12 includes the global key G, as indicated at 38 and the system 18 includes the global key G, indicated at 38.

Initially, the system 12 derives the encrypted key kf1 from a fuse value F1, as indicated in block 20. In one embodiment, the system 12 has a unique, stored, randomly generated 128 bit value which is unique to the system 12. It may be stored in a permanent memory, which may be referred to as a fuse or fuse block. The fuse or fuse block 14 may permanently store the fuse value. However, any type of permanent memory storage may be used for this purpose. The fuse block 14 provides the fuse F1 to the block 20. The block 20 then derives, from fuse F1, the encrypted value kf1.

In one embodiment, kf1 may be derived from F1 using the Advanced Encryption Standard (AES), available from NIST Publications, Springfield, Va., 22161. Then kf1 is encrypted with the global key G, still as indicated in block 20. Then the system 12 sends the value of kf1, encrypted with the global key G, as indicated at 30, over the communication link 22, back to the system 18.

In the system 18, the encrypted key kf1 is decrypted using the global key G from the storage 38 in block 32. Then kf1 is encrypted with a key kf2, which comes from a fuse block 40 on the system 18. The fuse value F2 is totally unique to the system 18 and may be a random number permanently stored on the system 18, for example, in the form of a 128 bit randomly generated value. The value of kf1, encrypted with kf2, is stored in a system flash memory, as indicated at 42, in accordance with one embodiment.

Thus, referring to FIG. 2, the system 10 begins to boot and the system 12 boots up and determines it has no key for communications with the system 18, as determined in block 50. Then the system 18 requests the communications key from the system 12, as indicated in block 52. The system 12 then generates the desired key using a global key 38 and a fuse block fuse 14 in one embodiment. The encrypted key is then sent to the system 12, as indicated in block 54. The system 18 then securely stores the communication key, as indicated in block 56.

In some embodiments, this key exchange may be done the first time that the system 18 boots up. From then on, all communications are possible in a cryptographic mode using the now exchanged key that is stored in the flash. This key will be useful as long as there is no hardware change. Messages can then be sent across the DMI interface using vendor defined messages. Thus, secure communications are now possible between the two devices, despite the fact that only one of the devices has full cryptographic capabilities. DMI messages may be used as long as both sides of the communication have a suitable mailbox that has been established.

In some embodiments, the key exchange code just described may be part of the boot up code. Thus, there may be a storage or memory that stores the boot up code, code for the system 18, and the code to implement the secure communication protocol described herein. For example, this may all be stored in the flash memory 42. In some embodiments, the boot code may contain manageability capabilities to protect this stored code.

System 18 may perform cryptographic operations on behalf of system 12 with a media source (like a software media player) or other applications 78 and then pass the result to system 12. However, the general concept is that any one processor may use the security functions of another processor to enable secure communications between the two processors. As one example, every time that you need to play a movie, a session key may be sent across a communication interface. The application running on a central processing unit, such as a Windows® media player, may authenticate the system 12 hardware before setting up a session key for transmission of video data.

The above-described protocol is one way to make such an exchange. The scheme allows for the application to authenticate the hardware using system 18 cryptographic hardware and then securely transmits the session key to system 12. From this point, the application and system 12 can communicate securely using the session key.

Figure 3:
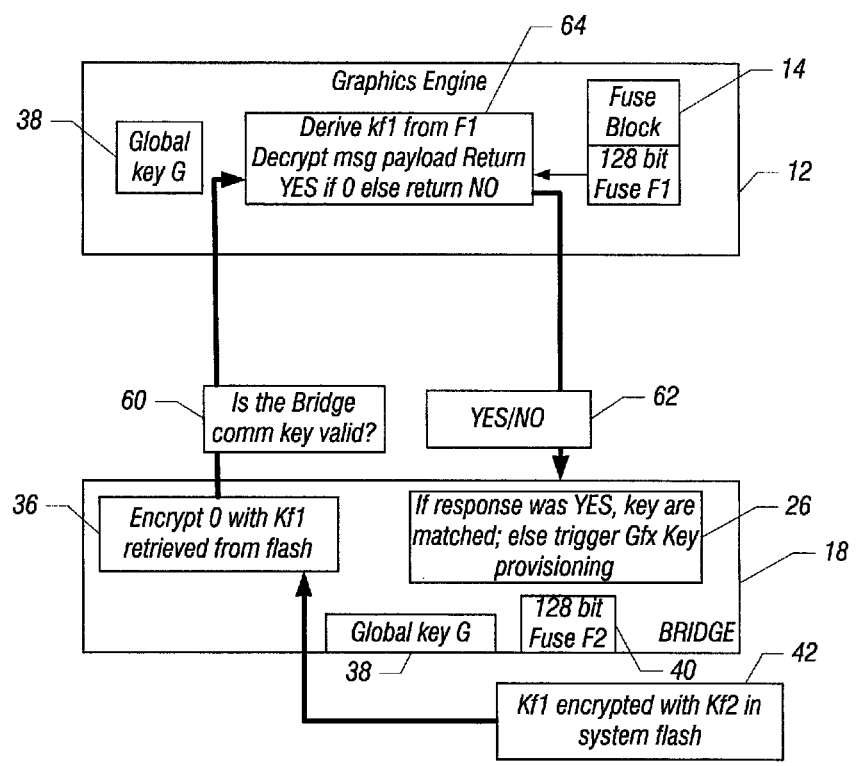
FIG. 3 is a depiction of a system in accordance with one embodiment of the present invention.

Referring to FIG. 3, each time there is another boot, a check may be implemented to make sure that the right key is possessed by the system 18. Thus, upon booting, the system 18 obtains the encrypted key from flash 42. It unwraps the key using the kf2 value from the fuse 40. It takes the kf1 value and encrypts a standard variable, such as zero in this case, as indicated in block 36. Then it sends the encrypted value to the system 12 with a message 60 asking if the communication key is valid and telling the system 12 that it has encrypted zero with the key that is believed to be common between the two devices. The system 12 then derives kf1 using the fuse F1 from the fuse block 14. It decrypts the message payload, as indicated in block 64 and returns a yes if it finds a zero and, otherwise, it returns a no, as indicated at 62. Again, the communications 60 and 62 may be over a secure protocol, such as the DMI.

The system 18 determines if the response was yes and the key matched. If so, it knows it does not need to do a new key exchange. Otherwise, it triggers a new key exchange, as indicated in block 26.

Thus, referring to FIG. 4, the system 18 checks, upon each new boot, to determine whether the key is valid (block 66). It does so by encrypting a zero with kf1 and sending a message to the system 12, as indicated in block 68. The system 12 checks the validity of the key and sends a response, as indicated in block 70. Then, in block 72, the system 18 processes the response from the system 12 and takes appropriate steps. Namely, if the key is valid, communications may continue using the key and, otherwise, a new key exchange must be established using the protocol of FIG. 1 and FIG. 2.

Playback of premium content, such as DVD movies on a personal computer, is carried out by a software application provided by independent software vendors. These application vendors sign the content license and, hence, are responsible for the secure playback of the content. To fulfill the terms of their contract license, the player applications need to ensure that the data flow of content from the DVD disk to the display device is protected. For video playback, typical applications perform a portion of the video decode and rely on a graphics hardware for the remaining decode and display. Since the application needs to send the premium content over to the graphics device for further processing, the application needs to authenticate that device and set up a secure channel for sending this data over.

The standard available mechanisms for authentication of the devices setting up a secure channel are fairly complex and generally involve the application and graphics hardware sharing a secret key. The graphics hardware uses a public-private key infrastructure and sends the public key to the application. The use of a shared secret key may be weak from a robustness point of view since a compromise of the secret key in the application affects all other vendors. Relying on graphics hardware to have a public/private key infrastructure involves a significant hardware cost since it involves RSA style exponentiation.

A session key setup may be negotiated between the application and the bridge to the graphics engine. This can happen at the beginning of each playback session, such as the beginning of a movie.

Figure 5:
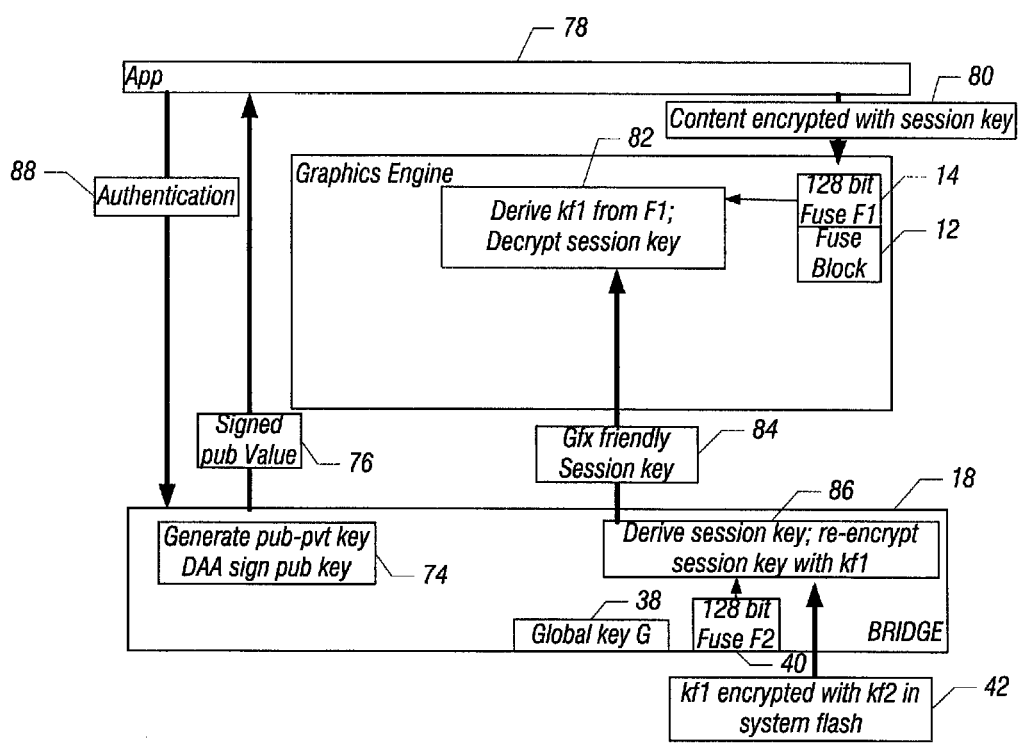
FIG. 5 is a depiction of a system in accordance with one embodiment of the present invention.

Thus, referring to FIG. 5, the application 78, which may be a software application of an independent software vendor, initiates authentication of a graphics device, as indicated at 88. This request actually goes to the system 18, which generates a public/private key DAA signed public key, as indicated in block 74. Thus, the application interacts with the bridge to perform the DAA authentication. The system 18 generates and sends a signed Diffie-Hellman value to the application, as indicated at 76, and the application 78 verifies the signature. Then the application and the bridge derive a unique session key.

The system 18 retrieves the graphics bridge communication key from the flash 42 and derives a session key re-encrypted with kf1 (block 86). Then the system 12, compatible session key 84 is sent over DMI to the system 12. At block 82, the graphics engine derives kf1, using the fuse F1 from the fuse block 14. With kf1, it is able to decrypt the session key. As a result, content encrypted with the session key 80 may be sent from the application 78 and decoded in whole or in part by the system 12.

Thus, referring to FIG. 6, the application initiates authentication of the graphics device, as indicated in block 90, through the bridge. The application and the bridge derive a unique session key, as indicated in block 92. Then the bridge sends the encrypted session (block 94). Multiple writes may be required to get the session key to the graphics engine.

Thus, in some embodiments, both a platform specific key in the form of the fuse block 14 and the fuse 40 may be used, together with a global key 38, which is not platform specific. Even if the global key were broken, the platform specific key is still useful.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

In accordance with some embodiments of the present invention, capabilities described herein may be implemented in hardware, software, or firmware. In software or firmware embodiments, a computer readable medium, such as a semiconductor memory, may store instructions for implementation by a processing entity, such as a central processing unit, a bridge, or any controller. For example, in some embodiments, each of the steps illustrated in FIGS. 1-6 may be implemented in software and may be executed on any processor or processing element. For example, in one embodiment, such instructions may be implemented by execution on the system 18. In other embodiments, portions of the sequences may be executed on the systems 12 and/or 18.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
enabling a second processor based system including a graphics processing unit to use a cryptographic capability of a first processor based system including a central processing unit for secure communications using said cryptographic capability between an application executed on the central processing unit and the graphics processing unit;
establishing a secure communication path between the first and second processor based systems using a non-platform specific key used by any platform and platform specific keys, one platform specific key only used by the first processor based system and the second platform specific key only used by the second processor based system, each of said platform specific keys derived using a value stored in a fuse:
performing a cryptographic operation on said first processor based system for said second processor based system to obtain results; and
sending the results of said cryptographic operation to said second processor based system over said secure communication path.

2. The method of claim 1 including enabling the graphics processing unit to communicate with a bridge.

3. The method of claim 2 including enabling the playback of secure media content using the bridge having a cryptographic functionality and the graphics processing unit without said cryptographic functionality.

4. The method of claim 1 including using as said non-platform specific key a global key common to said processor based systems.

5. The method of claim 1 including requesting a communication key during a boot process, and providing the communication key during the boot process.

6. The method of claim 5 including securely storing said communication key.

7. The method of claim 6 including checking on each boot to ensure that a stored communication key is valid.

8. The method of claim 1 including deriving a unique session key between the application and one of said processor based systems.

9. The method of claim 8 including sending said unique session key in encrypted form to the other of said processor based systems.

10. A non-transitory computer readable medium storing instructions executed by a computer to perform a sequence comprising:
enabling a second processor based system including a graphics processing unit to use a cryptographic capability of a first processor based system including a central processing unit for secure communications using said cryptographic capability between an application executed on the central processing unit and the graphics processing unit;
establishing a secure communication path between the first and second processor based systems using a non-platform specific key used by any platform and platform specific keys, one platform specific key only used by the first processor based system and the second platform specific key only used by the second processor based system, each of said platform specific keys derived using a value stored in a fuse:
performing a cryptographic operation on said first processor based system for said second processor based system to obtain results; and
sending the results of said cryptographic operation to said second processor based system over said secure communication path.

11. The medium of claim 10 further storing instructions to implement the sequence including enabling the graphics processing unit to communicate with a bridge.

12. The medium of claim 11 further storing instructions to implement the sequence including enabling the playback of secure media content using the bridge having a cryptographic functionality and the graphics processing unit without said cryptographic functionality.

13. The medium of claim 10 further storing instructions to implement the sequence including using a unique key value on each of said processor based systems.

14. The medium of claim 13 further storing instructions to implement the sequence including using a global key common to said processor based systems.

15. The medium of claim 10 further storing instructions to implement the sequence including requesting a communication key during a boot process, and providing the communication key during the boot process.

16. The medium of claim 15 further storing instructions to implement the sequence including securely storing said communication key.

17. An apparatus comprising:
   a first processor based system including a central processing unit and said first processor based system having a cryptographic capability; and
   a second processor based system, including a graphics processing unit without said cryptographic capability, to use the cryptographic capability of the first processing based system for secure communications between an application executing on said first processor based system, and said second processor based system, to establish a secure communication path between the first and second processor based systems using a non-platform specific key used by any platform and platform specific keys, one platform specific key only used by the first processor based system and the second platform specific key only used by the second processor based system, each of said platform specific keys derived using a value stored in a fuse, to perform a cryptographic operation on said first processor based system for said second processor based system to obtain results and to send the results of said cryptographic operation to said second processor based system over said secure communication path; and
   a communications interface between said first and second processor based systems, said communications interface to use the cryptographic capability of the first processor based system to enable the application to securely communicate with the second processor based system.

18. The apparatus of claim 17 including a bridge having a cryptographic capability wherein said application enables playback of secure media content using the bridge having the cryptographic functionality and the graphics processing unit without said cryptographic functionality.

* * * * *